United States Patent [19]

Ejiri et al.

[11] Patent Number: 5,629,062
[45] Date of Patent: May 13, 1997

[54] FIBER REINFORCED PLASTIC PIPE AND PROCESS FOR PRODUCING THE SAME

[75] Inventors: Hiroshi Ejiri; Hideyuki Nakajima, both of Kamisu-machi, Japan

[73] Assignee: Petoca, Ltd., Tokyo, Japan

[21] Appl. No.: 582,223

[22] Filed: Jan. 3, 1996

Related U.S. Application Data

[63] Continuation of Ser. No. 302,952, Sep. 12, 1994, abandoned.

[30] Foreign Application Priority Data

Sep. 13, 1993 [JP] Japan ..................... 5-249748

[51] Int. Cl.$^6$ ................. B32B 1/08; B32B 31/26
[52] U.S. Cl. ............. 428/36.9; 428/34.5; 428/36.3; 428/36.4; 428/35.9; 428/36.91; 138/143; 138/144; 138/146; 156/173; 156/188; 156/190; 156/191; 156/307.1; 205/164
[58] Field of Search .............. 428/34.5, 34.6, 428/34.7, 36.3, 36.4, 36.91, 36.9, 35.9, 245, 246, 462; 156/187, 191, 188, 190, 173, 175, 307.1; 138/141, 143, 144, 146, 147; 473/316, 319, 320; 205/164

[56] References Cited

U.S. PATENT DOCUMENTS

| | | | |
|---|---|---|---|
| 5,028,464 | 7/1991 | Shigetoh | 428/36.3 |
| 5,093,162 | 3/1992 | Fenton et al. | 156/190 |
| 5,191,486 | 3/1993 | Sato et al. | 156/187 |
| 5,231,783 | 8/1993 | Utsuno et al. | 156/187 |
| 5,317,828 | 6/1994 | Yasui | 156/190 |
| 5,385,767 | 1/1995 | Noguchi | 428/36.91 |

FOREIGN PATENT DOCUMENTS

| | | |
|---|---|---|
| 2169503 | 9/1973 | France. |
| 2200469 | 4/1974 | France. |
| 2424207 | 12/1974 | Germany. |
| 62-124278 | 6/1987 | Japan. |
| 312541 | 2/1991 | Japan. |
| 967324 | 8/1964 | United Kingdom. |
| 1440931 | 6/1976 | United Kingdom. |

OTHER PUBLICATIONS

Patent Abstracts of Japan, vol. 018, No. 65 (M–1554), Feb. 3, 1994, JP–A–05 286 057, Nov. 2, 1993.

Database WPI, Derwent Publications Ltd., AN 84–045177; Patent Abstracts of Japan, vol. 8, No. 87 (M–291), Apr. 20, 1984, of JP–A–59 005 030, Jan. 11, 1984.

Database WPI, Derwent Publications Ltd., AN 88–351664, JP–A–55 127 941, Oct. 4, 1980.

*Primary Examiner*—Ellis Robinson
*Assistant Examiner*—Rena L. Dye
*Attorney, Agent, or Firm*—Oblon, Spivak, McClelland, Maier & Neustadt, P.C.

[57] ABSTRACT

A fiber reinforced plastic pipe comprising a cylindrical inner layer formed by winding a prepreg sheet containing a thermosetting resin as a matrix and an outer layer formed by winding a thermoplastic resin sheet or tape around the inner layer, said inner and outer layers being heat cured and thermocompression bonded in one united body; and a process for manufacturing the fiber reinforced plastic pipe. When the fiber reinforced plastic pipe is manufactured, the thermosetting resin is used for forming the inner layer and the thermoplastic resin is used for forming the outer layer. Moreover, a metal coat can be firmly bonded to the surface of the outer layer. Hence, a fiber reinforced plastic pipe prominently improved in impact resistance, abrasion resistance and lightweight properties can be provided.

3 Claims, No Drawings

FIBER REINFORCED PLASTIC PIPE AND PROCESS FOR PRODUCING THE SAME

This application is a continuation of application Ser. No. 08/302,952, filed on Sep. 12, 1994, now abandoned.

FIELD OF THE INVENTION

The present invention relates to a fiber reinforced plastic pipe which can be favorably used for an automobile driving shaft, a roll for transferring a film, a printing roll, etc. as its applied articles, and a process for producing the same. More particularly, the invention relates to a fiber reinforced plastic pipe comprising an inner layer made of a fiber reinforced plastic containing a thermosetting resin as a matrix and an outer layer made of a thermoplastic resin, which shows high bond strength between these layers and good dimensional stability and is capable of being provided outside of the outer layer with a metal-plated layer having high bond strength to the outer layer, and also relates to a process for producing said pipe.

BACKGROUND OF THE INVENTION

Fiber reinforced plastic (FRP) pipes have been heretofore manufactured by impregnating a reinforcing material such as inorganic fibers (e.g., glass fibers and carbon fibers) or organic fibers (e.g., aramide fibers) with an uncured thermosetting resin, a thermoplastic resin or other resin as a matrix, charging a mold with these starting materials, drawing the starting materials, or extruding the starting materials, to make them into a shape of a pipe.

Of such starting materials as mentioned above, carbon fiber reinforced plastics (hereinafter abbreviated to "CFRP") excellent in specific strength and specific modulus of elasticity have been predominantly employed in recent years. As the matrix resin, thermosetting resins are used in most cases because of their excellent heat resistance, water resistance, solvent resistance, chemical resistance, dimensional stability, etc., and among these resins, epoxy resins, which show high bond strength to carbon fibers, are mainly used as the matrix.

A prepreg obtained by impregnating carbon fibers with the epoxy resin and subjecting the resin to the B-stage procedure (i.e., drying a liquid thermosetting resin to polymerize it to a certain degree) is commercially available. This prepreg is wound around a mandrel and heat cured to form a pipe. The pipe can be also formed by winding a bundle of fibers (strands or filaments) impregnated with the epoxy resin around a mandrel at a certain angle through filament winding and then curing the resin. The pipes formed by the above methods can be per se used. However, if the pipes need surface smoothness, or painting is required to be effected on the pipe surface, or the pipes need roundness required for use as a high-speed rotator, they are often subjected to surface abrading treatment.

Because of the surface abrading treatment, both the carbon fibers and the resin are exposed outside on the pipe surface, and this results in various problems. For example, the carbon fibers split finely on the pipe surface in the course of the abrasion to produce surface defects. Further, since the both ends of the pipe cut after removal from the mold are rigid and fragile, the corner portions of those ends are easily dropped even by slight impact applied to the pipe during the abrasion, and depending upon the structure of layer lamination of the reinforced fibers, even breakage of the pipe occurs frequently.

For coping with these problems, there has been made a trial that the pipe surface is made to be a uniform resin surface free from exposure of any carbon fibers thereby to render the surface strong enough to withstand impact of a certain level. In the conventional process for manufacturing a pipe using a mandrel, however, a prepreg or resin-impregnated filaments are wound around the mandrel, and then a shrinkable tape is further wound tightly around the prepreg or filaments to allow the resin to ooze out, followed by curing. Therefore, this process involves such a problem that the resin cannot be hardly left in a relatively large thickness on the pipe surface.

In order to manufacture a FRP pipe coated with a resin, accordingly, generally adopted is a method wherein operations consisting of coating the surface of the FRP pipe with a resin and curing the resin are repeated to form a resin surface layer having a predetermined thickness.

Also known is a method of encasing a FRP pipe in a heat-shrinkable tube such as a Teflon tube and heat shrinking the tube to coat the pipe surface in order to impart releasability to the surface of the FRP pipe, or a method of forming a coat of modified PPE (polyphenylene ether) on the surface of the FRP pipe through co-extrusion to manufacture a composite pipe in order to improve appearance of a glass fiber reinforced, modified PPE pipe.

These methods, however, involve various problems. For example, the number of the steps is made large to cause increase of the cost, the bond strength between the inner surface of the Teflon shrinkable tube and the outer surface of FRP is low to cause separation therebetween in the use of the resulting pipe, or the PPE is a thermoplastic resin having low bond strength to the carbon fibers. Thus, any simple and easy technique for manufacturing a FRP pipe provided with a resin coat of sufficient thickness as the outer layer has not been developed yet.

In the use of the FRP pipe, the surface of the pipe is frequently subjected to metal coating treatment to cope with static electrification on the surface or to improve surface hardness and abrasion resistance. Accordingly, various proposals have been made with respect to the surface metal coating.

For example, there is known a method comprising abrading a CFRP pipe to expose the resin and the carbon fibers on the surface of the pipe and coating the abraded surface with copper through electroplating utilizing the conduction properties of the carbon fibers. According to this method, however, the bond strength between the CFRP surface and the plated copper is low, e.g., about several tens g/cm, and hence lifting takes place in the course of the plating or in the course of the abrasion after formation of the plated layer.

In order to compensate such low bond strength, the copper-plated layer is made thick, usually about 500 μm. However, formation of such thick plated layer deteriorates the lightweight properties of the pipe given by the use of CFRP, and in the use of the pipe as a rotator, the moment of inertia becomes large, and therefore the inherent performance of the CFRP is not sufficiently exerted.

Japanese Patent Publication No. 12541/1991 discloses technique for increasing the bond strength between the plated copper and the CFRP, which comprises coating the abraded surface of the CFRP pipe with a resin added with an Ag powder, curing the resin to form a conductive resin layer and effecting electroplating utilizing the conduction properties of the resin layer. Japanese Patent Laid-Open Publication No. 124278/1987 discloses technique comprising adsorbing metallic colloid on the FRP prior to the plating operation and effecting electroless plating to impart conduction properties to the CFRP.

Even in the above technique, however, the bond strength and the conduction properties are not sufficiently improved, or rather, the process is complicated and the cost is increased.

By the way, thermoplastic resins such as an ABS (Acrylonitrile-Butadiene-Styrene) resin and a polypropylene resin can be generally provided with a metal-plated coat showing high bond strength to the resins through electroless plating.

However, the CFRP which contains as a matrix the thermoplastic resin capable of being plated through electroless plating is low not only in the bond strength between the carbon fibers and the resin but also in the heat resistance, and moreover tends to be distorted by thermal expansion or heat shrinkage owing to the environmental temperature given when the CFRP is molded into a pipe or thereafter. Hence, it is difficult to manufacture a pipe of high dimensional stability.

The present inventors have earnestly studied on such problems as mentioned above, and as a result, they have found that a FRP pipe having high bond strength between its inner and outer layers and improved in impact resistance can be obtained by a process comprising the steps of winding an uncured B-staged prepreg obtained by impregnating reinforcing fibers with a thermosetting resin to form an inner layer, winding a thermoplastic resin sheet or tape around the inner layer to form an outer layer so as to unite those two layers, and heat curing the inner layer while thermocompression bonding the outer layer to the inner layer. The present inventors have also found that a FRP pipe having a metal coat, which is lightweight, excellent in surface hardness and abrasion resistance and has attained thinning of the metal-plated layer, can be manufactured by using, as a resin for forming the outer layer, a thermoplastic resin capable of being heightened in the bond strength to the metal-plated layer obtained by electroless plating. Based on these findings, the present invention has been accomplished.

OBJECT OF THE INVENTION

The present invention is intended to solve such problems associated with the prior art technique as mentioned above, and it is an object of the invention to provide a fiber reinforced plastic pipe comprising an inner layer made of a fiber reinforced plastic containing a thermosetting resin as a matrix and an outer layer made of a thermoplastic resin, said pipe being excellent in bond strength between the inner and outer layers, dimensional stability and impact resistance, capable of being easily provided with a metal-plated layer on the surface of the outer layer, and capable of being improved in surface hardness and abrasion resistance with keeping the lightweight properties. It is another object of the invention to provide a process for manufacturing the above-mentioned fiber reinforced plastic pipe.

SUMMARY OF THE INVENTION

The fiber reinforced plastic pipe according to the present invention is a fiber reinforced plastic pipe comprising an inner layer formed by winding a prepreg sheet containing a thermosetting resin as a matrix and an outer layer formed by winding a thermoplastic resin sheet or tape around the inner layer, wherein the inner layer and the outer layer are heat cured and thermocompression bonded in one united body.

In the fiber reinforced plastic pipe according to the present invention, an epoxy resin can be used as the thermosetting resin and an ABS resin can be used as the thermoplastic resin.

In the fiber reinforced plastic pipe according to the present invention, a metal-plated layer can be formed on the surface of the outer layer through electroless plating.

The process for manufacturing a fiber reinforced plastic pipe according to the present invention comprises the steps of:

winding a prepreg sheet containing a thermosetting resin as a matrix to form a cylindrical inner layer, winding a thermoplastic resin sheet or tape around the inner layer to form an outer layer so as to unite the inner layer and the outer layer, and heat curing and thermocompression bonding the inner layer and the outer layer at the same time under the curing conditions of the thermosetting resin contained as the matrix in the prepreg sheet.

DETAILED DESCRIPTION OF THE INVENTION

The fiber reinforced plastic pipe and the process for manufacturing the pipe according to the present invention will be described in detail hereinafter.

The fiber reinforced plastic pipe according to the present invention is a FRP pipe having a sectional structure comprising an inner layer made of FRP containing a thermosetting resin as a matrix and an outer layer made of a thermoplastic resin. Such fiber reinforced plastic pipe is now explained in detail with reference to the process for manufacturing the pipe.

(A) Manufacture of fiber reinforced plastic pipe

The fiber reinforced plastic pipe according to the present invention is manufactured by winding a prepreg sheet containing a thermosetting resin as a matrix to form a cylindrical inner layer, then winding a thermoplastic resin sheet or tape around the inner layer to form an outer layer so as to unite the inner and outer layers, and heat curing and thermocompression bonding the inner and outer layers at the same time.

More specifically, the pipe of the present invention can be manufactured by winding a prepreg sheet containing a thermosetting resin as a matrix around, for example, a mandrel, then winding a thermoplastic resin sheet or tape around the inner layer to form an outer later so as to unite both layers, heat curing and thermocompression bonding those layers at the same time, and removing the molded product from the mold.

There is no specific limitation on the thermosetting resin to be used as a matrix in the prepreg sheet for forming the inner layer of the pipe of the present invention, and any thermosetting resins conventionally used for the manufacture of prepregs can be used according to the use application of the resulting pipe.

Examples of the thermosetting resins include epoxy resins (bisphenol type, novolak type, etc.), phenolic resins, urea resins, melamine resins, unsaturated polyester resins, diallyl phthalate resins and polyimide resins. These thermosetting resins are used in combination with, generally, curing agents and, if necessary, curing promotors. These curing agents and curing promotors are appropriately selected according to the type of the used thermoplastic resin. Among the above thermosetting resins, particularly preferred are thermosetting epoxy resins from the viewpoints of strength, bond properties, etc., and the epoxy resins are desirably used in combination with the curing agents.

Examples of such thermosetting epoxy resins include, bisphenol A, epoxidized phenolic novolak, epoxidized cresylic novolak, epoxidized p-t-butylphenolic novolak, alicyclic cyclooxirane and alicyclic glycidyl ester.

Examples of the curing agents for the epoxy resins include aliphatic amines, aromatic amines, tertiary amines, acid anhydrides, boron trifluoride-amine complexes and phenolic resin oligomers.

Examples of the curing promotors used for promoting the curing rate of the epoxy resins include imidazoles and mercaptans.

As the reinforcing fibers, any of high-strength and high-modulus fibers may be employed, and examples thereof include inorganic fibers such as glass fibers, carbon fibers, ceramic fibers (e.g., silicon carbide fibers, boron fibers, alumina fibers, alumina-silica fibers); and organic fibers such as aramide fibers.

In the prepreg sheet for use in the present invention, the reinforcing fibers are desired to be used in the form of a fibrous sheet material or a paper-like material, and more specifically, they are used in the form of a unidirectional sheet, a nonwoven fabric, a mat, a cloth (woven cloth, knitted cloth) or the like.

The prepreg sheet for use in the present invention is preferably prepared by impregnating the sheet-like or paper-like material composed of the above-mentioned reinforcing fibers with the thermosetting resin, followed by drying under heating so as to render the resin semi-cured (B-staged).

In the present invention, the prepreg sheet is wound to form a cylindrical inner layer. More specifically, after a release agent is applied onto a mandrel or a release sheet is provided on the mandrel, the prepreg sheet is wound plural times around the mandrel at a predetermined angle (i.e., the prepreg sheet is subjected to sheet winding) to give a multi-layer structure, so as to form an inner layer.

The winding angle of the prepreg sheet or the thickness of the resulting inner layer (degree of multi-layer structure) can be optionally determined according to the purpose. For example, it is possible that the prepreg sheet is wound around a mandrel at a certain angle against the longitudinal direction of the mandrel (for example, perpendicularly or obliquely). It is also possible that the prepreg sheet is wound around the mandrel with altering the angle periodically or at random, or with combining the periodic alteration and the random alteration of the angle.

As the thermoplastic resin sheet or tape used for forming the outer layer, desirable is a sheet or a tape made of a thermoplastic resin having high bond strength to the matrix of the FRP for forming the inner layer.

For further improving the bond strength to the matrix, the thermoplastic resin sheet or tape may be subjected to dry or wet surface modification treatment such as oxidation treatment, silane treatment or plasma treatment.

Examples of the thermoplastic resins include polyethylene (PE), polypropylene (PP), polyvinyl chloride (PVC), methacrylic resin (PMMA) and ABS resin, all of which are conventionally known as general-purpose resins. Also included are general-purpose engineering plastics such as polycarbonate (PC), nylon 6 (1A), polyacetal copolymer (POM), polybutylene terephthalate (PBT), polyphenylene oxide (PPO) and modified polyphenylene ether(PPE); and special-purpose engineering plastics such as polyether sulfone (PES), polysulfone (PSF) and polyphenylene sulfide (PPS).

Use of the ABS resin, PC or POM among those resins is considered to be preferred from the viewpoint of the cost or the plating efficiency to manufacture a metal-plated FRP pipe. In more detail, by the use of the commercially available ABS resin, PC or POM as a resin for forming the outer layer, the fiber reinforced plastic pipe of the invention can be provided with a metal-plated layer showing particularly superior bond properties on the outer surface of the outer layer.

Examples of the commercially available ABS resin include ME produced by Denki Kagaku Kogyo K. K. and Diapet ABS 3001M produced by Mitsubishi Rayon Co., Ltd.

Further, also included in the commercially available ABS resin are A3500 and A3600 (PA-6) produced by Unitika, Ltd., Novamate PL50 (PC) produced by Mitsubishi Kasei Corporation, Multilon MK1000A (PC) produced by Teijin Chemicals, Ltd., Tenac PT300 (POM) produced by Asahi Chemical Industry Co., Ltd., Jeracon MP-01 and MP-02 (POM) produced by Polyplastic K. K., Zailon X6501 produced by Asahi Chemical Industry Co., Ltd., and MINDEL A-670 (PSF) produced by Amoco Japan Ltd.

The thermoplastic resin sheet or tape is preferably thin because of ease of molding, and it is suitably selected in consideration of the number of the molding steps or the thickness of the thermoplastic resin layer required for the molded pipe. The thickness of the thermoplastic resin sheet or tape is preferably in the range of 0.1 to 0.5 mm, though it depends on the hardness of the resin.

After the outer layer is formed by winding the thermoplastic resin sheet or tape around the inner layer which is formed by winding the prepreg sheet and united to the inner layer, heat curing of the inner layer and thermocompression bonding of the outer layer are carried out at the same time. Therefore, the material of the thermoplastic resin sheet or tape for forming the outer layer is preferably determined so that the sheet or tape sufficiently shows flexibility at a temperature at which the inner layer-forming prepreg sheet can be cured and the inner layer-contact portion of the tape or sheet can be fusion bonded thoroughly to the inner layer.

The thermoplastic resin to be used for forming the outer layer is preferably has a heat distortion temperature lower than the curing temperature of the thermosetting resin for forming the inner layer. For example, when a prepreg containing as a matrix an epoxy resin having a curing temperature of 120° to 130° C. is used as the inner layer-forming material, a sheet or a tape made of an ABS resin having a heat distortion temperature of about 80° to 100° C. is used as the outer layer-forming material. In this case, even if a laminate consisting of the inner layer and the outer layer formed from the above materials is heated to a curing temperature of the epoxy resin, any separation between the thermosetting resin layer and the thermoplastic resin layer does not take place.

Further, in the flexural test of a tabular, cured laminate having been simultaneously subjected to heat curing and thermocompression bonding (laminate obtained by laminating an ABS resin sheet having a thickness of 0.2 mm on each of the upper and lower sides of a unidirectional laminate of epoxy resin-impregnated carbon fiber prepregs and molding in an autoclave), any interfacial separation between the CFRP layer (inner layer) and the ABS resin layer (outer layer) was not observed, but transmission of cracks in the axial direction of the fibers was observed in the CFRP layer. This means that the bond strength between the epoxy resin (i.e., matrix) and the ABS resin is higher than the bond strength between the carbon fibers and the epoxy resin in the CFRP layer.

In the manufacture of the pipe, the outer layer is formed by winding the thermoplastic sheet or tape around the inner layer, and in more detail, it can be formed in the following manner.

First, a sheet or a tape is prepared from a thermoplastic resin which is distorted at a temperature lower than the curing temperature of the thermosetting prepreg for forming the inner layer. The thermoplastic resin sheet or tape is wound tightly around the inner layer, and then a heat-shrinkable tape is further wound tightly around the sheet or tape at regular intervals, followed by curing at a predetermined temperature. In this case, a mold or an autoclave may be used in place of the heat-shrinkable tape, and heating is carried out under application of pressure to effect thermocompression bonding or fusible bonding of the outer layer.

The fiber reinforced plastic pipe according to the present invention may further have an additional inner most layer formed on the inner surface of the inner layer. The additional inner most layer is made from a thermoplastic resin which is as the same material as that exemplified for the outer layer and may be formed by winding a thermoplastic resin sheet or tape around the mandrel before forming the uncured inner layer.

The fiber reinforced plastic pipe according to the present invention has the above-mentioned structure and is manufactured as described above, but it may have a metal coat on the surface of the outer layer.

The metal coat may be formed by any methods of painting, dry plating and wet plating. Examples of the dry plating method include vacuum deposition, sputtering and ion sputtering. Examples of the wet plating method include chemical plating, electroplating and a combination of the chemical plating and the electroplating. The electroplating is employable only for conductive materials, and impartation of the conduction properties to the resin pipe can be realized by applying a conductive film on the outer layer or incorporating a conductive material into the thermoplastic resin for forming the outer layer.

Of the above-mentioned methods for forming a metal coat, particularly preferred is chemical plating because a thin-wall metal-plated layer exhibiting high bond strength to a non-conductive material can be formed. After the chemical plating, the FRP pipe imparted with conduction properties may be subjected to electroplating.

Electroless plating, which is suitably used for forming a metal coat, will be explained below in detail.

(B) Electroless plating.

The term "electroless plating" generally means a method of reduction depositing metallic ion contained in a solution by the use of chemicals to form a metal coat on a material to be plated. The electroless plating is widely employed as a means to form a metal coat on an insulator on which a metal coat cannot be formed by electroplating, and uses thereof are extended to automobile parts, electric parts, electronic parts, etc.

The electroless plating process generally comprises degreasing, etching, sensitization, activation (catalyst treatment) and chemical plating. Reagents and conditions for use in each procedures are appropriately determined in accordance with the type of the outer layer-forming material of the FRP pipe.

For example, in the formation of a metal coat in the case of a FRP pipe using an ABS resin as the outer layer-forming resin, the surface of the ABS resin is subjected to alkali degreasing treatment (e.g., caustic soda solution treatment) and then subjected to etching treatment (e.g., chromic acid-sulfuric acid mixture treatment) to roughen the ABS resin surface.

Thereafter, sensitization (e.g., stannos chloride treatment), activation or catalyst treatment (e.g., palladium catalyst treatment) are generally conducted, and then electroless plating by the use of copper, nickel, etc. (e.g., treatment with copper sulfate+Rochelle salt+caustic soda+formalin solution) is carried out. Thus, a metal (copper) plated layer is formed through electroless plating.

The ABS resin used herein has been conventionally used as a resin to be plated in the field of automobile parts, and the plating technique thereof has been already established. Moreover, it is well known that the ABS resin is one of resins having the highest bond strength to the plated metal among various thermoplastic resins and is available at a low cost.

In the electroless plating of the outer layer made of the ABS resin, the surface of the outer layer is subjected to etching treatment with the above-mentioned chromic acid-sulfuric acid mixture, whereby a butadiene component present on the surface of the outer layer is dissolved to form a number of fine holes on the outer layer surface. Owing to anchoring effect of the fine holes, the bond strength of the metal coat formed on the surface of the outer layer can be enhanced.

The treatment solution for use in the etching treatment is appropriately selected in accordance with the type of the resin used. Examples of the treatment solutions include bichromic anhydride type sulfuric acid solutions, mixed acid solutions, phosphoric acid solutions, cyclohexane solutions, acetone and toluene. These solutions may be used singly or in combination of two or more kinds.

The anchoring effect can be obtained also by a method consisting of filling the outer layer-forming thermoplastic resin with an easily soluble filler such as calcium carbonate and treating them with a treatment solution capable of dissolving the filler such as a sulfuric acid aqueous solution, a method consisting of filling the outer layer-forming thermoplastic resin with a filler such as potassium titanate whisker and subjecting them to surface etching treatment, or a mechanical method using sandblast, emery paper or the like.

The fiber reinforced plastic pipe according to the present invention can be provided with a relatively thin-wall metal coat through electroless plating or other means as described above, and then it can be further provided with an electroplated layer, such as a rigid chrome layer, having a thickness and performance suitable for the use application of the resulting pipe through electroplating or other means.

EFFECT OF THE INVENTION

When the fiber reinforced plastic pipe of the present invention is manufactured, as described above, the thermosetting resin is used for forming the inner layer and the thermoplastic resin is used for forming the outer layer, and moreover a metal coat can be firmly bonded to the surface of the outer layer. Hence, a fiber reinforced plastic pipe prominently improved in impact resistance, abrasion resistance and lightweight properties can be provided.

In the process for manufacturing a fiber reinforced plastic pipe according to the present invention, the inner layer formed by winding a thermosetting resin prepreg sheet and the outer layer formed by winding a thermoplastic resin sheet or tape around the inner layer were heat cured and thermocompression bonded in one united body. Hence, a FRP pipe showing high bond strength between the inner and outer resin layers and having excellent dimensional stability and prominently improved impact resistance can be manufactured. Further, the surface of the outer layer made of the thermoplastic resin can be subjected to electroless plating, etc., whereby a metal-coated FRP pipe further improved in abrasion resistance and appearance can be easily manufactured.

EXAMPLE

The present invention is further described with reference to the following examples, but it should be construed that the invention is in no way limited to those example.

Example 1

Pitch type carbon fiber strands (2 k) having a tensile strength of 320 kg/mm² and a tensile modulus of elasticity of 62×10³ kg/mm² were impregnated with a mixture of an epoxy resin [EP154 (70 parts by weight), EP828 (10 parts by weight), EP1001 (20 parts by weight)], dicyandiamide (DICY) as a curing agent in an amount of 5 parts by weight per 100 parts by weight of the epoxy resin and dichlorodimethylurea (DCMU) as a curing agent in an amount of 5 parts by weight per 100 parts by weight of the epoxy resin, to obtain a prepreg (unit weight: 100 g/m², resin content: 31.5% by weight). This prepreg was wound around a mandrel made of SUS304 (outer diameter: 100 mm, length: 2,000 mm, wall thickness: 5 mm) at an angle of 90° against the longitudinal direction of the mandrel to give a 9-layer structure and further at an angle of 0° against the same direction to give a 9-layer structure, so as to form a laminate. Then, around this laminate was wound an ABS resin sheet (thickness: 0.25 mm) to give a 2-layer structure, around which a heat-shrinkable tape was further wound, followed by curing and thermocompression bonding of the laminate in one united body at 130° C. for 2 hours.

In the ABS resin-coated CFRP pipe obtained after curing, no separation took place at the ABS resin sheet-laminated portion, and the whole of the ABS resin layer was sufficiently bonded.

Further, when the laminated portion was observed by a scanning electron microscope, it was confirmed that no boundary was present and bonding on the interface was thoroughly made.

Ten pipes of the above type were manufactured and dropped from the height of 5 m. As a result, no cracking took place in any of the pipes.

Example 2

Eighteen of the same carbon fiber prepregs as used in Example 1 were laminated one upon another in uni-direction to give a laminate, and two of the same ABS resin sheets (each thickness: 0.25 mm) as used in Example 1 were laminated on each of the upper and lower sides of the laminate, followed by curing and molding at a pressure of 3 kg/cm² and a temperature of 130° C. for 2 hours in an autoclave, to obtain an ABS resin-coated CFRP board. This board was then successively subjected to degreasing (treatment with a caustic soda solution), etching (treatment with a chromic acid-sulfuric acid mixture), sensitization (treatment with a stannos chloride solution), activation (treatment with a palladium chloride solution) and electroless copper plating (treatment with a mixture of copper sulfate, Rochelle salt, caustic soda and formalin), to form a copper coat having a thickness of about 5 µm.

Thereafter, electroplating (treatment with a copper sulfate solution, anode: copper plate) was carried out to obtain a CFRP board with a copper coat having a thickness of about 30 µm, which was used as a test specimen for the peel strength measuring test.

The test specimen was provided with a notch having a width of 1 cm, and one end of the notched portion was pulled by a peel test machine to measure a peel strength. As a result, the peel strength of the specimen was 1.2 kg/cm.

Example 3

The CFRP pipe obtained in Example 1 was subjected to the same copper plating (thickness: about 30 µm) as described in Example 2. As a result, occurrence of any lifting or pinhole was not observed. Further, a CFRP pipe with a copper coat having a thickness of about 150 µm was manufactured through electroplating, and the surface of the copper coat was abraded off in a thickness of about 50 µm. As a result, any lifting was not observed on the copper coat, and it was confirmed that the copper coat showed good bond properties.

Comparative Example 1

CFRP pipes having the same lamination structure as in Example 1 were manufactured in the same manner as described in Example 1 except that coating with the ABS resin was not carried out. The pipes were subjected to the same drop test as described in Example 1. As a result, cracking along the direction of 0° took place in 6 pipes out of the 10 pipes.

Comparative Example 2

Eighteen of the same carbon fiber prepregs as used in Example 1 were laminated one upon another in uni-direction, and they were cured and molded at a pressure of 3 kg/cm² and a temperature of 130° C. for 2 hours in an autoclave to obtain a CFRP board. The CFRP board was subjected to copper plating (thickness: about 30 µm) in the same manner as described in Example 2. When the copper-plated CFRP board was measured on the peel strength, it was 25 g/cm.

Comparative Example 3

The surface of the pipe manufactured in Comparative Example 1 was abraded to expose parts of carbon fibers on the surface, on which copper electroplating (thickness: about 150 µm) was effected. As a result, a great number of liftings and pinholes occurred.

What is claimed is:

1. A fiber reinforced plastic pipe consisting essentially of:
   a cylindrical inner layer formed by winding a prepreg sheet made of a reinforced fibrous sheet impregnated with a thermosetting resin;
   an outer layer formed by winding a thermoplastic resin sheet or tape bondable to metal around the inner layer, said inner and outer layers being heat cured and thermocompression bonded in one united body; and
   an outermost electroless metal-plated layer formed on and bonded to the outer surface of said outer layer.

2. The fiber reinforced plastic pipe as claimed in claim 1, wherein the thermosetting resin is an epoxy resin and the thermoplastic resin is an acrylonitrile butadiene sytrene, polycarbonate or polyacetal copolymer resin.

3. A process for manufacturing a fiber reinforced plastic pipe, consisting essentially of the steps of:
   winding a prepreg sheet made of a reinforced fibrous sheet impregnated with a thermosetting resin to form a cylindrical inner layer,
   winding a thermoplastic resin sheet or tape bondable to metal around the inner layer to form an outer layer so as to unite the inner and outer layers,
   heat curing and thermocompression bonding the inner layer and the outer layer in one united body under curing conditions of said thermosetting resin, and
   forming and bonding an outermost electroless plated-metal layer on the outer surface of said outer layer by electroless plating.

* * * * *